(12) United States Patent
Yano

(10) Patent No.: US 6,776,019 B2
(45) Date of Patent: Aug. 17, 2004

(54) EXTRUSION DIE FOR HOLLOW MEMBER, MANDREL FOR SAID EXTRUSION DIE AND MALE DIE FOR SAID EXTRUSION DIE

(75) Inventor: Sadahide Yano, Osaka (JP)

(73) Assignee: Yugen Kaisha Yano Engineering, Osaka (JP)

(*) Notice: Subject to any disclaimer, the term of this patent is extended or adjusted under 35 U.S.C. 154(b) by 117 days.

(21) Appl. No.: 10/033,946

(22) Filed: Dec. 27, 2001

(65) Prior Publication Data

US 2003/0124214 A1 Jul. 3, 2003

(51) Int. Cl.[7] .............................................. B21C 25/04
(52) U.S. Cl. ........................................ 72/269; 72/467
(58) Field of Search ........................ 72/264, 269, 467, 72/468

(56) References Cited

U.S. PATENT DOCUMENTS 5,572,894 A * 11/1996 Yano ............................ 72/269
6,351,979 B1 * 3/2002 Inamura et al. ............... 72/269

\* cited by examiner

Primary Examiner—Ed Tolan

(57) ABSTRACT

An extrusion die for a hollow member includes: a male die for defining a plurality of hollow portions of the hollow member, the male die including an annular base portion and a bridge portion bridging the annular base portion; a female die for defining an outer peripheral portion of the hollow member, the female die being fitted in the annular base portion; and a mandrel having a plurality of forming protrusions, the mandrel being inserted and held in a mandrel holding slit formed in a center of the bridge portion in a fore-and-aft direction. The mandrel includes a mandrel main portion divided into a plurality of divided members and a plurality of rigid pins each arranged in a fore-and-aft direction of the mandrel main portion, and wherein the rigid pins are pinched by and between the divided members of the mandrel main portion with tip portions of the rigid pins protruding from an front end of the mandrel main portion, whereby the tip portions constitute the forming protrusions.

13 Claims, 10 Drawing Sheets

EXTRUSION DIE FOR HOLLOW MEMBER, MANDREL FOR SAID EXTRUSION DIE AND MALE DIE FOR SAID EXTRUSION DIE

BACKGROUND OF THE INVENTION

1. Field of the Invention

The present invention relates to an extrusion die for manufacturing a metal hollow member such as an aluminum hollow member, a mandrel for the extrusion die, and a male die for the extrusion die.

2. Description of Related Art

For example, as shown in FIG. 14, a conventional extrusion die for manufacturing a hollow member 1 (see FIG. 13) includes a male die 101 for forming hollow portions 1a of the hollow member 1 and a female die 102 for forming the external peripheral portion of the hollow member 1. The female die 102 is fitted in an annular base portion 103 of the male die 101.

The male die 101 includes the aforementioned annular base portion 103 and a bridge portion 104 formed on the rear face (i.e., upstream-side surface) of the annular base portion 103. The bridge portion 104 includes a mandrel holding slit 105 extending in the fore-and-aft direction at the central portion thereof. Into this mandrel holding slit 105, a mandrel 108 having a mandrel main portion 106 with comb-shaped forming protrusions 107 is inserted from the rear side of the mandrel holding slit 105 and held therein. The female die 102 having a forming aperture 109 penetrated in the fore-and-aft direction of the female die 102 is fitted in a fitting aperture 110 formed in the axial center of the annular base portion 103 to be connected with the male die 101 concentrically. Thus, the forming gap 111 corresponding to the cross-section of the hollow member 1 to be extruded is formed between the forming protrusions 107 and the female-die forming aperture 109.

The forming protrusions 107 of the mandrel 108 are required to have such hardness that can bear high extrusion pressure at the time of extrusion. Accordingly, the forming protrusions 107 are usually made of super-hard material such as cemented carbide or ceramics and formed by an electric-spark forming method.

In a conventional die, however, since the forming protrusions 107 of the mandrel 108 are integrally formed at the tip of the mandrel main portion 106, the whole mandrel is made of super-hard material, resulting in an expensive component.

Furthermore, since the forming protrusions 107 are integrally formed on the mandrel main portion 106, damage of the forming protrusions 107 causes an exchange of the entire mandrel 108, causing increased running costs.

For example, in order to increase the number of hollow portions of the hollow member arranged side by side, it is necessary to increase the number of the forming protrusions 107 formed on the tip portion of the mandrel main portion 106 or decrease the thickness of each forming protrusion 107. However, there was a limitation to give further precise processing to the tip portion of the mandrel main portion 106.

SUMMARY OF THE INVENTION

It is an object of the present invention to provide an extrusion die for a hollow member which can decrease the costs for manufacturing the hollow member and for maintaining the extrusion die and can easily cope with more precise processing.

It is another object of the present invention to provide a mandrel for the aforementioned extrusion die.

It is still another object of the present invention to provide a male die for the aforementioned extrusion die.

According to the first aspect of the present invention, an extrusion die for a hollow member, comprises: a male die for defining a plurality of hollow portions of the hollow member, the male die including an annular base portion and a bridge portion bridging the annular base portion; a female die for defining an outer peripheral portion of the hollow member; and a mandrel having a plurality of forming protrusions, the mandrel being inserted and held in a mandrel holding slit formed in a center of the bridge portion in a fore-and-aft direction, wherein the mandrel includes a mandrel main portion divided into a plurality of divided members and a plurality of rigid pins each arranged in a fore-and-aft direction of the mandrel main portion, and wherein the plurality of rigid pins are pinched by and between the divided members of the mandrel main portion with tip portions of the plurality of rigid pins protruding from a front end of the mandrel main portion, whereby the plurality of tip portions constitute the plurality of forming protrusions.

With this extrusion die, the mandrel main portion is divided into a plurality of divided members and the rigid pins are pinched by and between the divided members with tip portions of the rigid pins forming the forming protrusions protruding from a front end of the mandrel main portion. Accordingly, the mandrel main portion can be made of relatively cheap hard material such as die steel by employing the rigid pins made of super-hard materials. This decreases the entire costs for the mandrel.

According to the second aspect of the present invention, a mandrel for use in an extrusion die for extruding a hollow member, the mandrel comprises: a mandrel main portion which is divided into a plurality of divided members; and a plurality of rigid pins each disposed in a fore-and-aft direction of the mandrel main portion, wherein the plurality of rigid pins are pinched by and between the divided members of the mandrel main portion with tip portions of the plurality of rigid pins protruding from a front end of the mandrel main portion, whereby the plurality of rigid pins constitute forming protrusions.

With this mandrel, it is possible to properly perform precise processing of the hollow member by the extrusion die.

According to the third aspect of the present invention, a male die for an extrusion die, wherein the male die defines a plurality of hollow portions of a hollow member and is combined with a female die defining an outer peripheral configuration of the hollow member, the male die comprises: an annular base portion; a bridge portion bridging the annular base portion; and a mandrel having a plurality of forming protrusions, the mandrel being inserted and held in a mandrel holding slit formed in a center of the bridge portion in a fore-and-aft direction, wherein the mandrel includes a mandrel main portion divided into a plurality of divided members and a plurality of rigid pins each arranged in a fore-and-aft direction of the mandrel main portion, and wherein the rigid pins are pinched by and between the divided members of the mandrel main portion with tip portions of the rigid pins protruding from an front end of the mandrel main portion, whereby the tip portions constitute the forming protrusions.

This male die can constitute the aforementioned extrusion die.

Other objects and the features will be apparent from the following detailed description of the present invention with reference to the attached drawings.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS

In the following embodiments, a hollow member to be manufactured by an extrusion die according to the present invention is a multi-bored flat tube 1 made of aluminum as shown for example in FIG. 13, which will be used for a heat exchanger for air-conditioners. Furthermore, the extrusion die according to the embodiment for extruding the tube 1 is the so-called multi-extrusion die for extruding a plurality of the tubes 1 simultaneously.

In addition, a hollow member to be extruded by an extrusion die according to the present invention may not be limited to the aforementioned tube 1 for use in heat exchangers, but may have various configurations and may be applied to various purposes. Furthermore, the material of the hollow member is not limited to aluminum, but may be various kinds of metal suitable for extrusion. Furthermore, the die is not limited to the so-called multi-extrusion type which can extrude a plurality of hollow members simultaneously, but may be the so-called single-extrusion type which extrudes a single hollow member.

Figure 1:
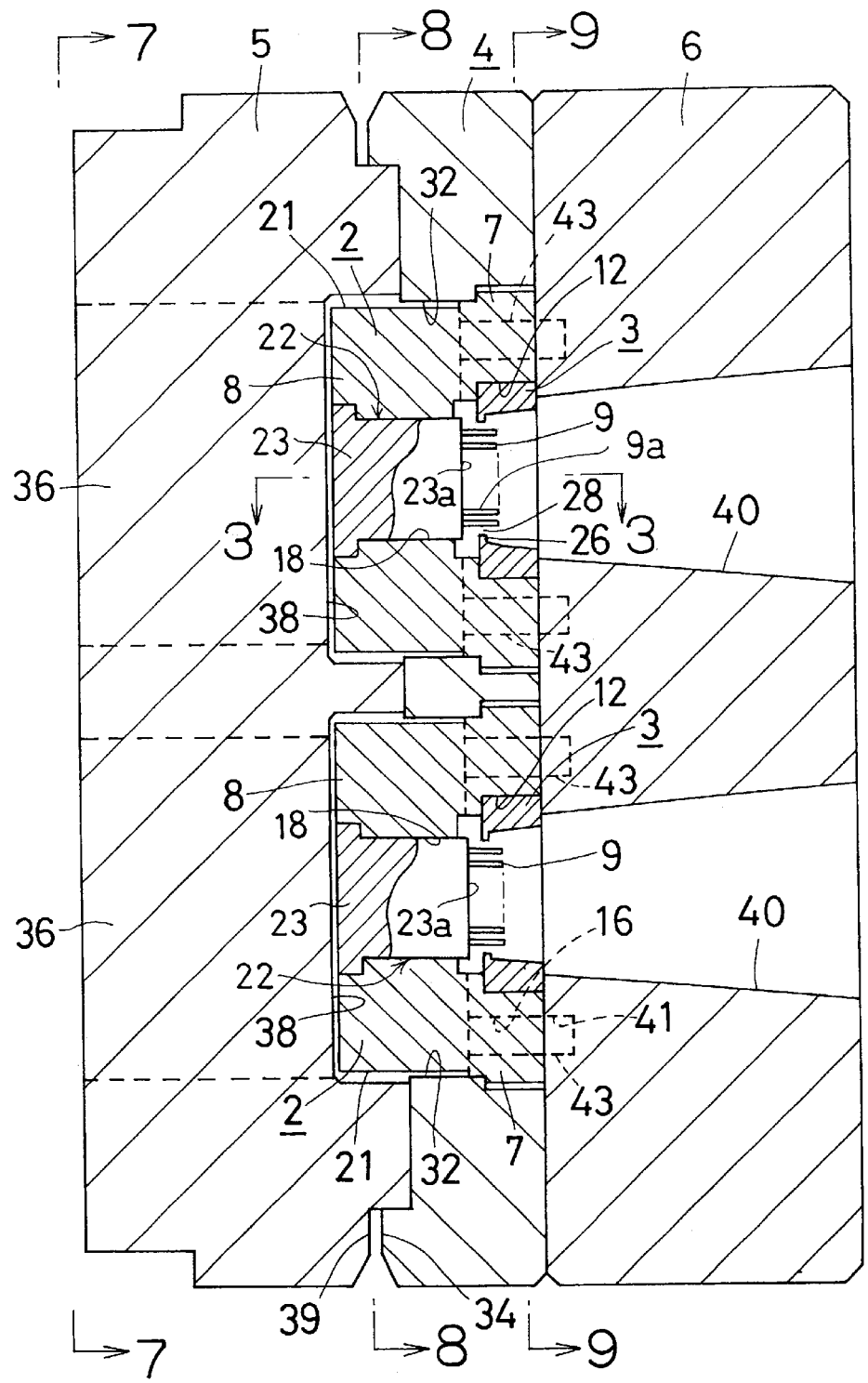
FIG. 1 is a cross-sectional view showing an extrusion die for a hollow member according to an embodiment of the present invention.
Figure 2:
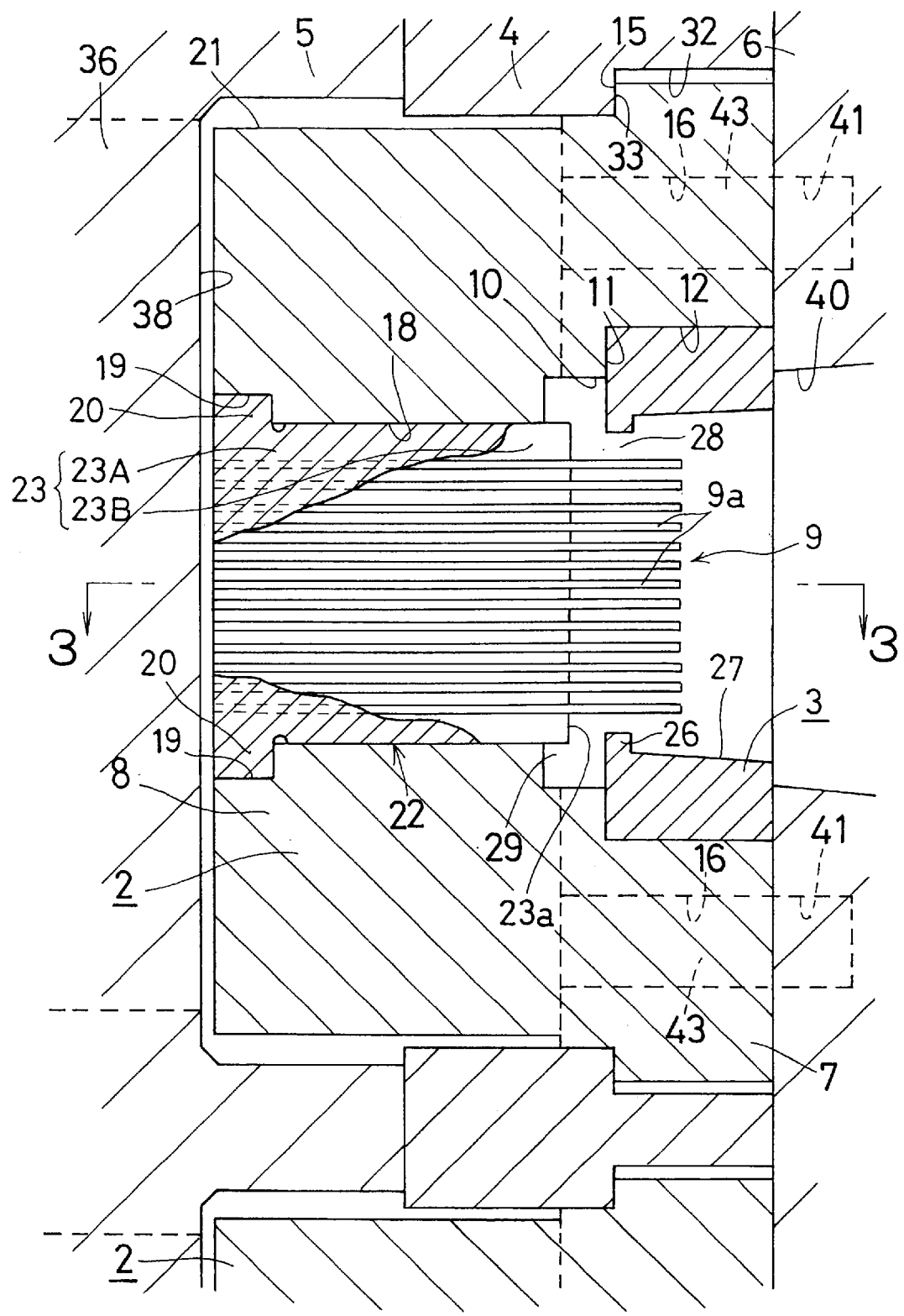
FIG. 2 is an enlarged cross-sectional view showing the joint state of both a male die and a female die constituting the extrusion die.
Figure 3:
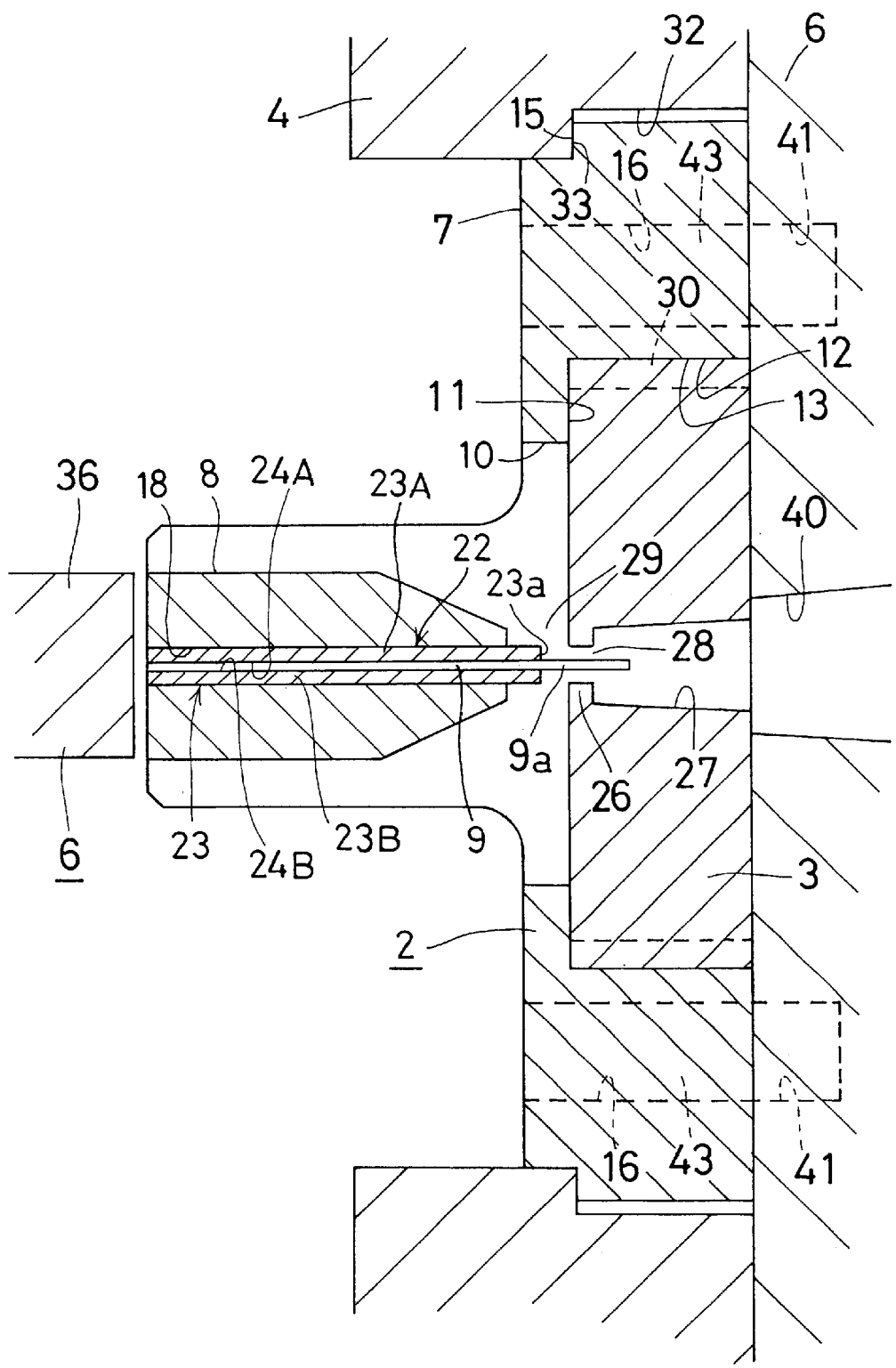
FIG. 3 is a cross-sectional view taken along the line 3—3 in FIGS. 1 and 2.
Figure 13:
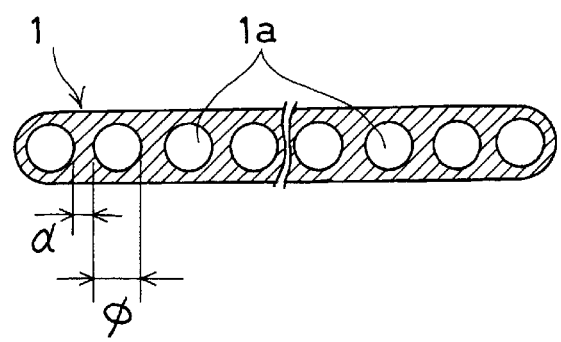
FIG. 13 is a cross-sectional view showing an example of a hollow member to be formed by an extrusion.
Figure 14:
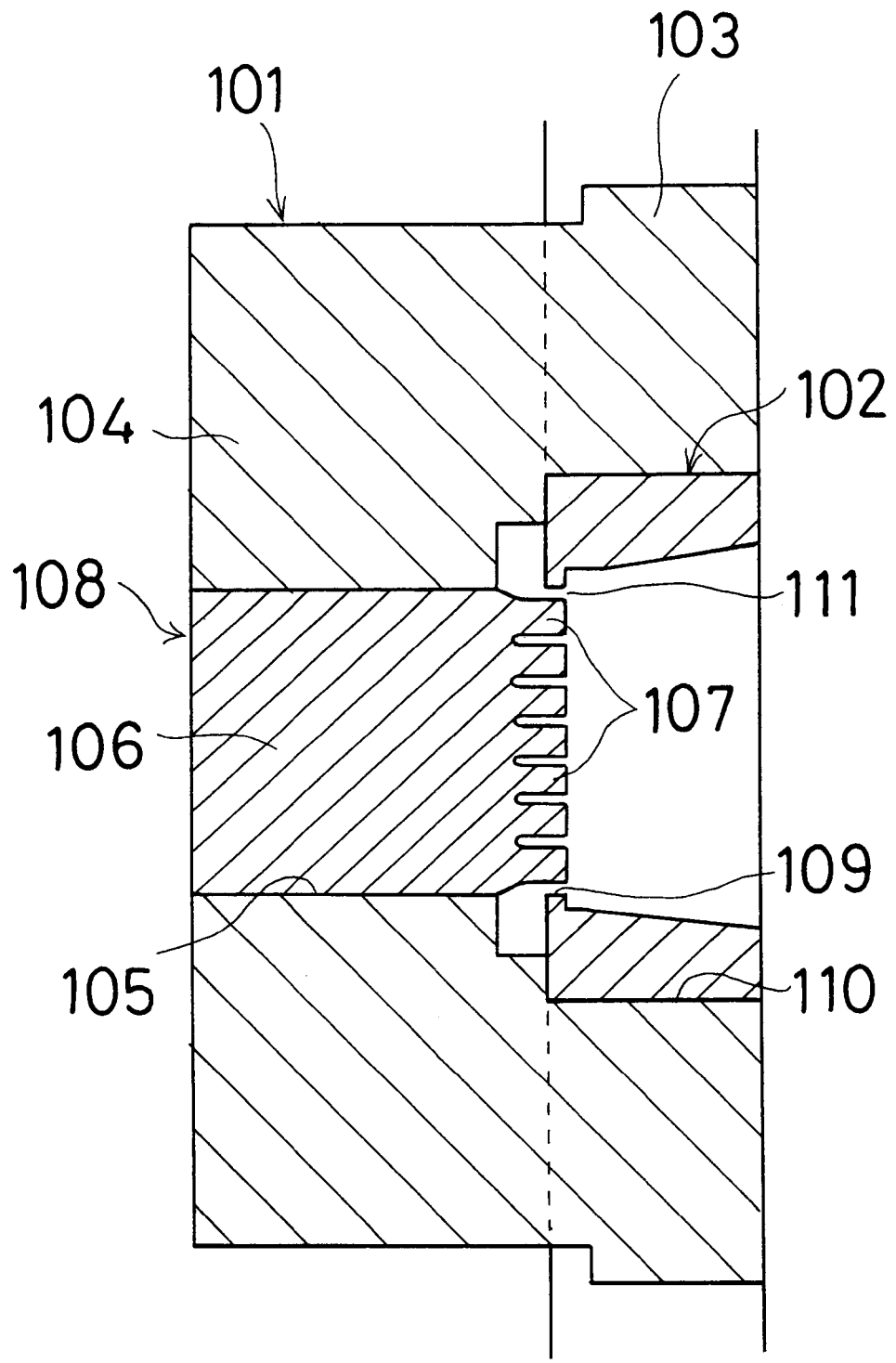
FIG. 14 is a cross-sectional view showing an extrusion die according to a conventional hollow member.

FIGS. 1 to 3 show an extrusion die for the aforementioned hollow member, i.e., the tube 1 shown in FIG. 13, according to an embodiment of the present invention.

In FIGS. 1 to 3, the reference numeral 2 denotes a male die, 3 a female die, 4 a holding die, 5 a metal-flow controlling die, and 6 a backer.

The male die 2 is used to define hollow portions 1a of the tube 1 (see FIG. 13), and is comprised of an annular base portion 7, a bridge portion 8 and a mandrel 22 with forming protrusions 9.

The annular base portion 7 is made of super-hard material such as cemented carbide or ceramics. The annular base portion 7 is provided with a central hole 10 with an annular stepped portion 11 which faces toward the extrusion direction and is located at the position near the rear end of the central hole 10. Thus, the portion of the central hole 10 ahead of the stepped portion 11 constitutes a female-die fitting hole 12 having a relatively larger diameter.

Figure 4:
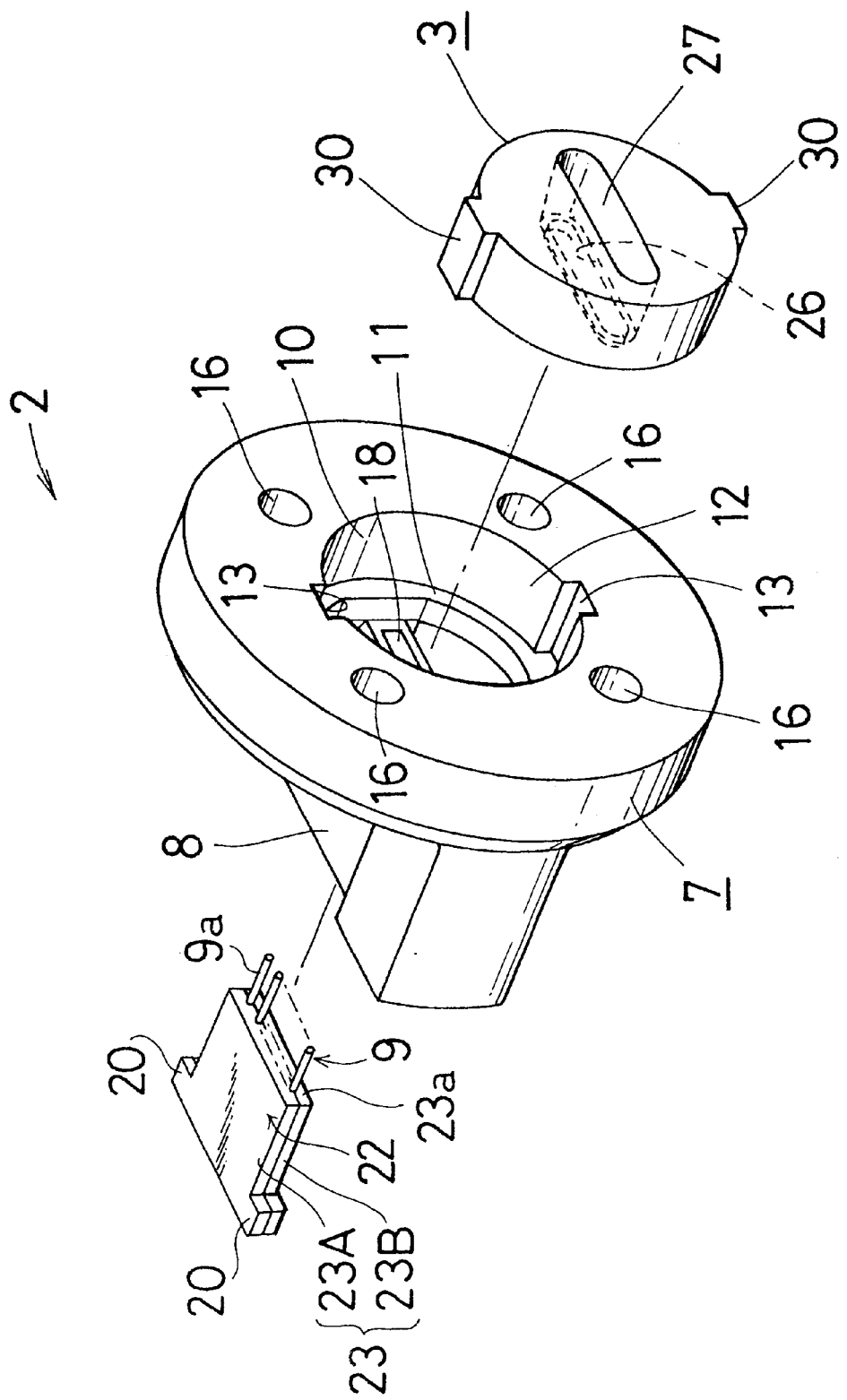
FIG. 4 is a perspective view showing the extrusion die in a disassembled state as seen from the front end side thereof.

As shown in FIG. 4, this female-die fitting hole 12 is equipped with a pair of axially extended key grooves 13 and 13 for positioning the female die 3 in the circumferential direction thereof.

Figure 5:
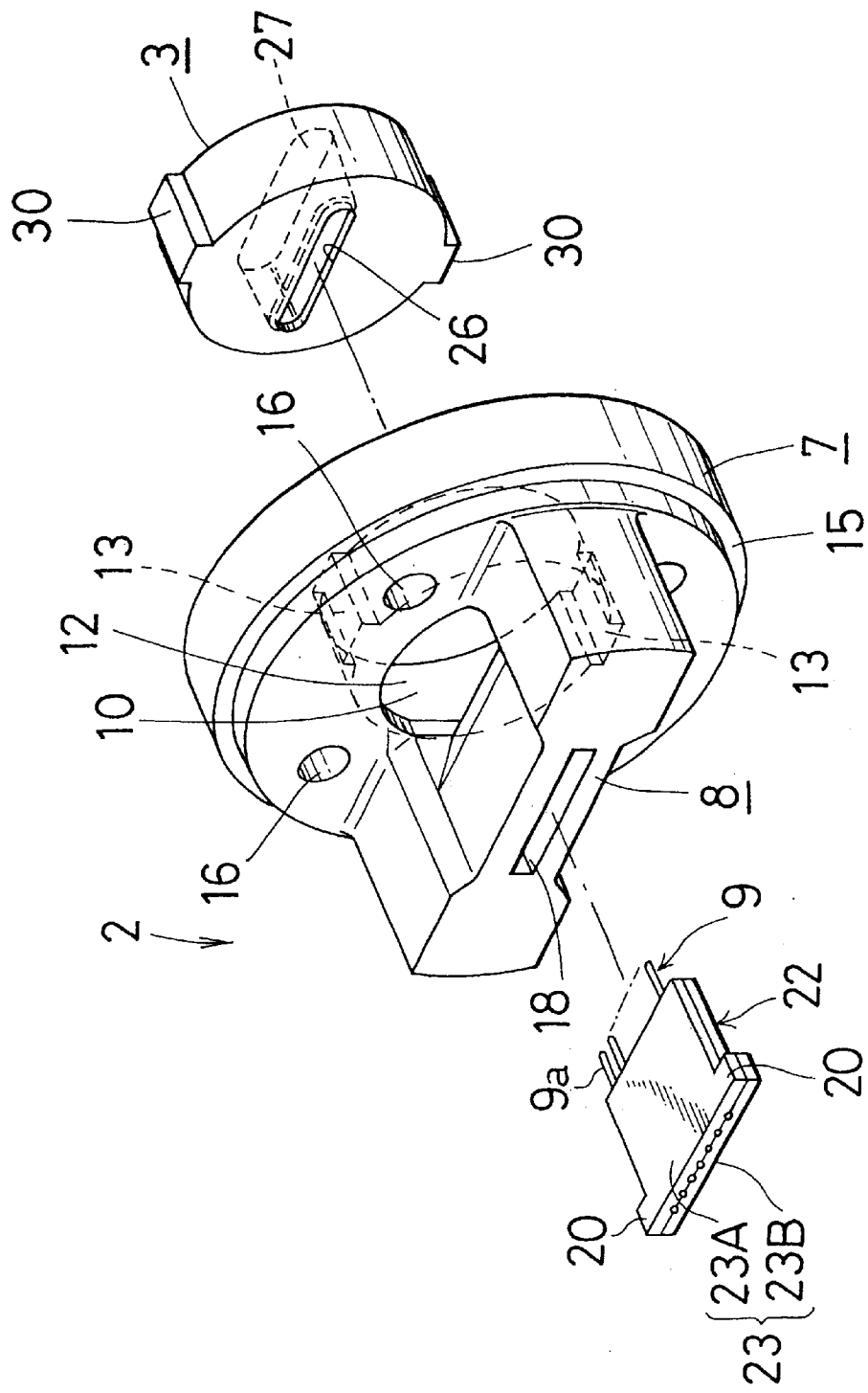
FIG. 5 is a perspective view showing the extrusion die in a disassembled state as seen from the rear end side thereof.

As shown in FIG. 5, the annular base portion 7 is provided with an annular stepped portion 15 formed at the rear peripheral edge of the annular base portion 7 and four dowel pin insertion apertures 16 penetrated therethrough and disposed at certain circumferential intervals.

The bridge portion 8 of the male die 2 holds the mandrel 22 at the axial center thereof, and is made of super-hard material such as cemented carbide or ceramics and integrally formed with the annular base portion 7. The bridge portion 8 is protruded rearward from the rear surface of the annular base portion 7 so as to cross the central hole 10. The front edge of the middle portion constituting the bridge portion 8 is positioned behind the stepped portion 11 formed in the central hole 10 of the annular base portion 7.

The bridge portion 8 has a mandrel holding slit 18 penetrated through the bridge portion in the fore-and-aft direction. At the lateral ends of the rear open end of the mandrel holding slit 18, laterally extended engaging stepped portions 19 and 19 are formed. These engaging stepped portions 19 and 19 are to be detachably engaged with engaging protrusions 20 and 20 integrally formed at the lateral rear ends of the mandrel 22 when the mandrel 22 is forcibly fitted in the mandrel holding slit 18.

In order to enhance the flow of the extrusion material, the middle portion of the bridge portion 8 is formed to have a tapered front edge.

The mandrel 22 consists of a generally rectangular plate-shaped mandrel main portion 23 and a plurality of rigid pins 9 each having a round cross-sectional shape and held by the mandrel main portion 23.

Figure 6:
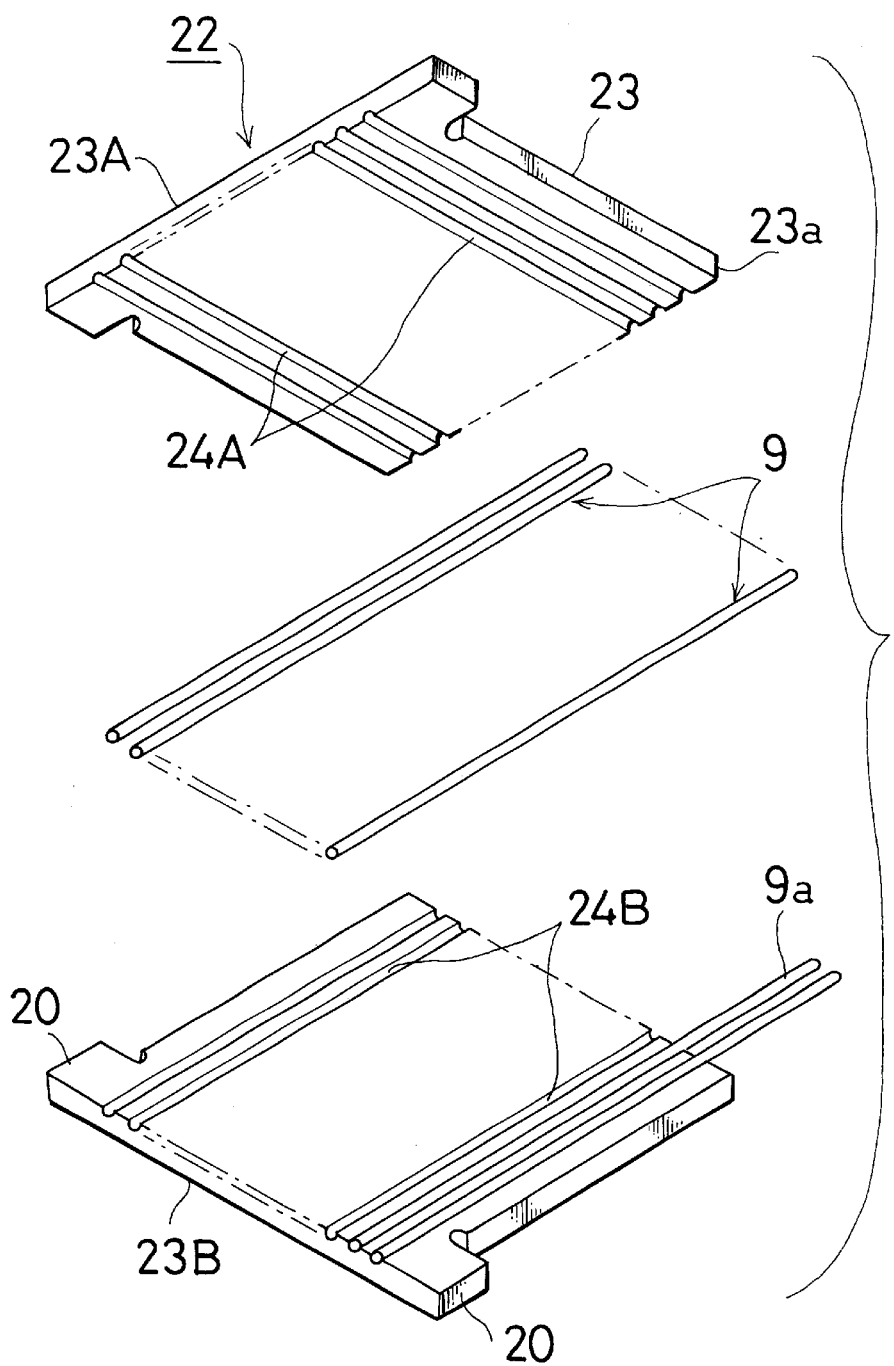
FIG. 6 is an exploded perspective view showing a mandrel.

As shown in FIGS. 3 to 5, the mandrel main portion 23 is divided in the thickness direction thereof into two pieces, or upper and lower divided members 23A and 23B. Each divided member is made of, for example, die steel and formed into a generally rectangular plate shape. On each opposing surface of the divided members 23A and 23B, as shown in FIG. 6, a plurality of pin holding grooves 24A and 24B extending from the front edge to the rear edge of each divided member, respectively, are formed at certain intervals in the widthwise direction thereof. In this embodiment, each groove 24A and 24B has a semicircular cross-section, so that the corresponding grooves form a circular cross-section when the aforementioned divided members 23A and 23B are coupled with each other.

The rigid pin 9 is made of super-hard material such as cemented carbide or ceramics, and formed to have a circular cross-section. These rigid pins 9 are fitted in the pin holding grooves 24A and 24B and pinched by and between the upper and lower divided members 23A and 23B with a certain length of the tip portion 9a of each rigid pin 9 protruding from the front edge surface 23a of the mandrel main portion 23. Thus, each of these protruding tip portion 9a constitutes a forming protrusion.

Since the aforementioned pin holding grooves 24A and 24B are formed on each opposing surface of the divided members 23A and 23B, respectively, a plurality of rigid pins 9 can be assuredly held in the mandrel main portion 23 in an orderly positioned state. In this embodiment, the pin holding grooves 24A and 24B extend along the entire length of the divided members 23A and 23B. The pin holding groove, however, may not necessarily have such a length, but may be enough to have a length that can assuredly hold the rigid pin 9.

The mandrel main portion 23 in which the aforementioned plurality of rigid pins 9 are pinched by and between the upper and lower divided members 24A and 24B is forcibly and tightly inserted into the mandrel holding slit 18 from the rear portion thereof. Thus, the mandrel main portion 23 with the rigid pins 9 is fixed in the bridge portion 8. In this state, the tip portions 9a of the pins 9 protrude forward from the plane including the stepped portion 11 of the annular base portion 7.

The female die 3, which defines the outer peripheral portion of the tube 1, is made of super-hard material such as cemented carbide or ceramics, and is formed into a round shape. This female die 3 is provided with a forming-aperture bearing portion 26 (which is also referred to as "forming aperture") formed at the axial central portion of the rear surface of the female die 3 and a relief opening 27 continuously formed from the bearing portion 26.

The female die 3 is designed to have an axial length corresponding to that of the female-die fitting hole 12 of the annular base portion 7 of the male die 2 and a diameter corresponding to that of the female-die fitting hole 12 so that the entire female die 3 can be closely fitted in the female-die fitting hole 12. Thus, the female die 3 is fitted in the female-die fitting hole 12 and integrated with the male-die annular base portion 7 by shrinkage fit processing.

In this state, the rear surface of the peripheral portion of the female die 3 contacts to and is positioned by the stepped portion 11 formed in the central hole 10. As a result, the tip portions (forming protrusions) 9a of the rigid pins 9 are arranged within the forming-aperture bearing portion 26 as shown in FIG. 10, whereby the forming gap 28 defined by the tip portions 9a and the bearing portion 26 is formed at a position near the rear surface of the male-die annular base portion 7.

At the rear side of the forming gap 28, a material joining space 29 is formed so that the material divided by the bridge portion 8 of the male die 2 can be joined under pressure and the joined material can pass through the forming gap 28.

Figure 10:
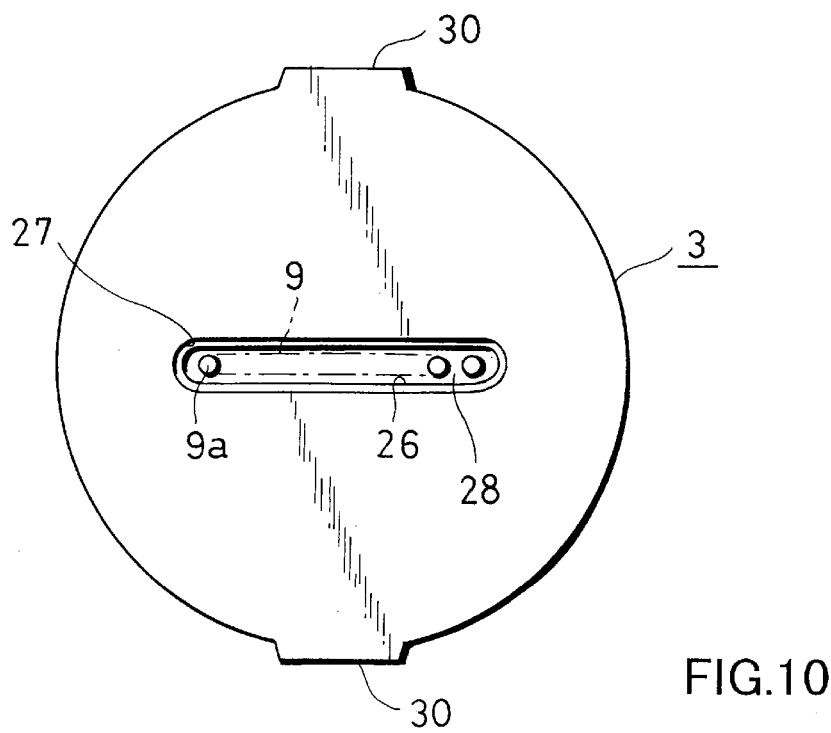
FIG. 10 is a front elevation view showing the positional relation between the female die and the pins of the mandrel.

Furthermore, as also shown in FIG. 10, the female die 3 is provided with a pair of axially extending key protrusions 30 and 30 corresponding to the key grooves 13 and 13 at the outer peripheral portion of the male die 2. The key protrusions 30 and 30 are fitted in the key grooves 13 and 13, so that the female die 3 is combined with the female die 3 at the predetermined circumferential direction.

Figure 8:
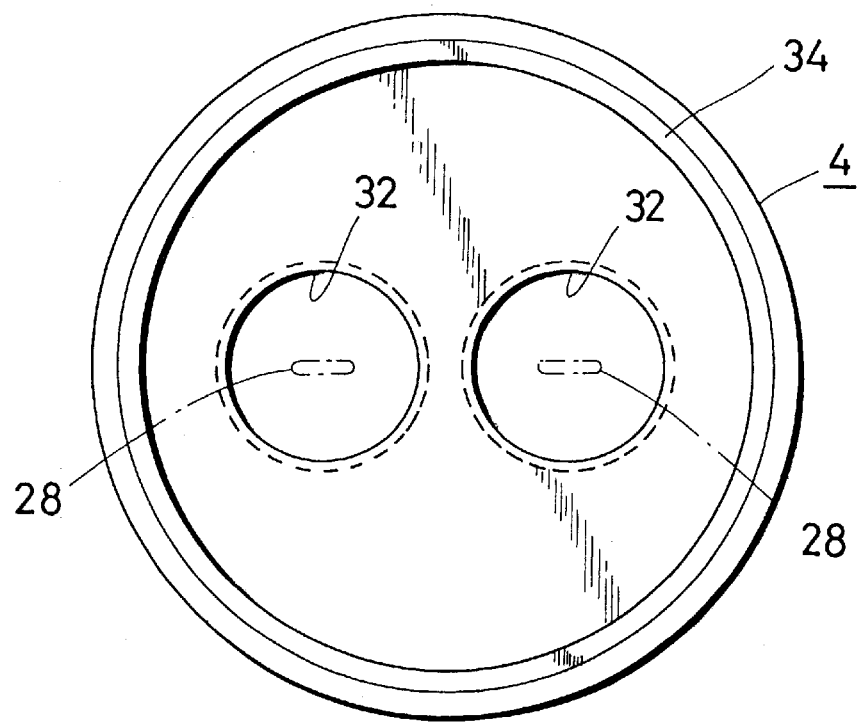
FIG. 8 is a cross-sectional view as seen from the line 8—8 in FIG. 1.

The holding die 4 holds the aforementioned two male dies 2 and 2, and has a disk shape made of steel material such as die steel. As shown in FIG. 8, the holding die 4 is provided with two adjacent circular holding holes 32 and 32 penetrated in the holding die. Each holding hole 32 has an annular stepped portion 33 at its axially middle portion. Thus, the male die 2 is positioned in the holding hole 32 with the annular stepped portion 15 of the male die 2 abutted to the annular stepped portion 33 of the holding die 4. This abutment of these annular stepped portions 15 and 33 forms a seal therebetween, to thereby prevent the leakage of extruding material.

In this state, the front end of the annular base portion 7 of the male die 2 generally coincides with the front end of the holding die 4 while the bridge portion 8 of the male die 2 is protruded rearward from the holding die 4.

The holding die 4 has an annular convex stepped portion 34 at the peripheral portion thereof so that the metal-flow controlling die 5 can be fitted to the holding die 4 in an aligned state.

Figure 7:
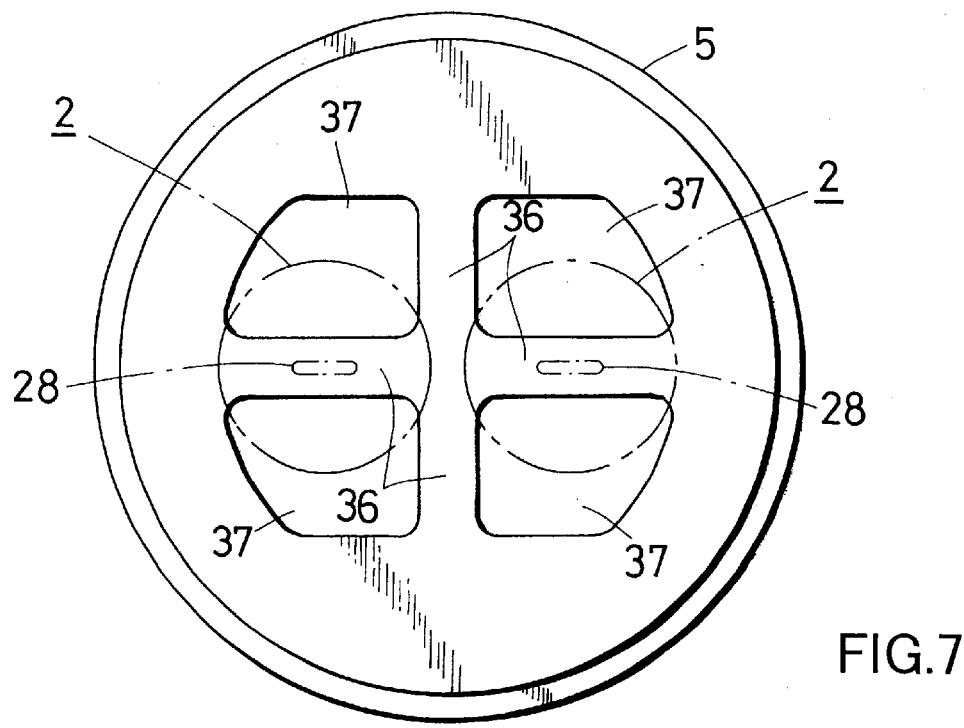
FIG. 7 is a rear view of the die as seen from the line 7—7 in FIG. 1.

The metal-flow controlling die 5 is a large disk-shaped member made of steel material such as die steel, and controls the flow of the extrusion material flowing from a container or the like towards each of the forming gaps 28. As shown in FIG. 7, the metal-flow controlling die 5 has a total of four independent material passing holes 37 divided by a bridge portion 36 disposed behind the corresponding bridge portions 8 and 8 of the male dies 2 and 2.

Corresponding to each of the male dies 2 and 2, dented portions 38 and 38 are provided in the front end surface of the metal-flow controlling die 5. Thus, in the state that the metal-flow controlling die 5 is combined with the rear portion of the holding die 4, the bridge portions 8 of the male dies 2 are disposed in corresponding dented portions 38 and 38 such that a predetermined gap is formed between the bridge portion 8 and the metal-flow controlling die 5.

At the front peripheral edge portion of the metal-flow controlling die 5, a fitting dented portion 39 is formed. Thus, the metal-flow controlling die 5 and the holding die 4 are coupled with the convex stepped portion 34 of the holding die 4 fitted to the fitting dented portion 39.

The backer 6 is made of steel material such as die steel, and is provided with relief holes 40. Each relief hole 40 has a peripheral size smaller than that of the female die 3, and is formed concentrically with the corresponding forming gap 28. The backer 6 is disposed on the front side of the holding die 4 to support the male dies 2 and female dies 3 from their front sides.

Figure 9:
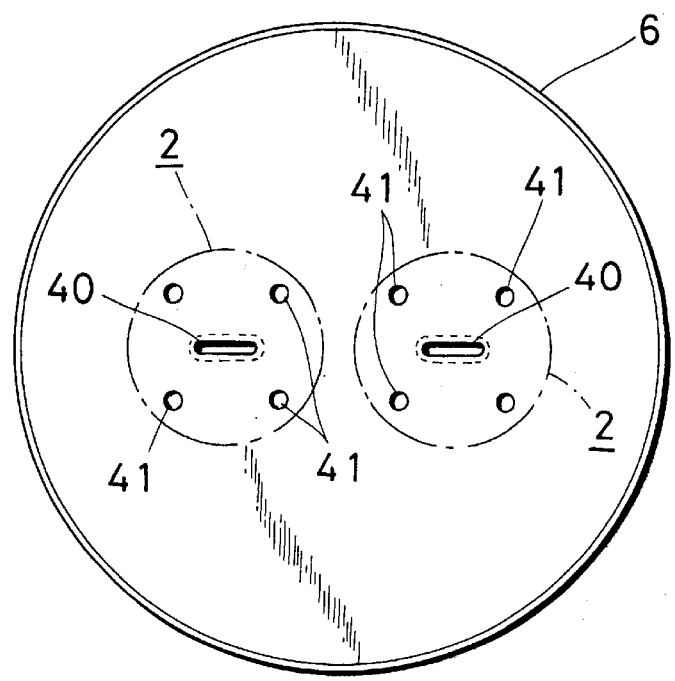
FIG. 9 is a cross-sectional view as seen from the line 9—9 in FIG. 1.

As shown in FIG. 9, around each relief hole 40, the backer 6 is provided with dowel pin apertures 41 corresponding to the dowel pin apertures 16 of the male dies 2. Thereby, the male dies 2 are connected to the backer 6 in a predetermined position with the dowel pins 43 inserted into the corresponding dowel pin apertures 16 and 41.

In the aforementioned extrusion die, the female dies 3 are combined with the male dies 2 in such a state that each female die 3 is fitted in each female-die fitting hole 12 of the annular base portion 7 of the male die 2.

In extrusion, the flow of the extrusion material supplied from a container or the like is controlled by the metal-flow controlling die 5. Thereafter, the extrusion material is distributed by the bridge 36 of the metal-flow controlling die 5 into independent four material passing holes 37, and then flows toward the bridge portions 8 and 8 of the male dies 2. The material distributed by the bridge portion 8 is joined and pressurized in the material joining space 29 to be adhered with each other, and passes through the forming gaps 28 each formed between the tip-portions 9a of the rigid pin 9 of the mandrel 22 and the forming-aperture bearing portion 26 of the female die 3. Thus, a hollow member 1 having a predetermined number of hollow portions 1a can be formed.

Since the mandrel main portion 23 of the mandrel 22 is divided into a plurality of divided members and the rigid pins 9 with tip portions which constitute forming protrusions are pinched by and between the divided members, it becomes possible to use expensive super-hard material only for the rigid pins 9. Accordingly, the mandrel main portion 23 can be made of relatively cheap hard material such as die steel, which can decrease the entire costs for the mandrel.

Furthermore, since the rigid pins 9 and the mandrel main portion 23 are separate members, even in cases where the tip portion 9a of the rigid pin 9 as a forming protrusion is deformed or damaged, the mandrel 22 can be reused by simply replacing the deformed or damaged pin. This can save the maintenance cost for the die.

Furthermore, since the aforementioned rigid pin 9 can be manufactured apart from the mandrel main portion 23, the cross-section and/or size of the rigid pin 9 can be arbitrarily designed.

For example, even in cases where it is required to increase the density of hollow portions of the hollow member 1 by decreasing the distance between the adjacent hollow portions (each having a diameter $\phi$ of about 0.5 mm), it is possible to easily obtain the predetermined hollow member 1 without deteriorating the size accuracy by simply employing rigid pins of a predetermined size.

Figure 11:
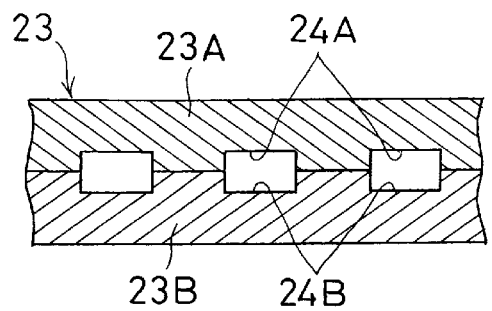
FIG. 11 is a cross-sectional view of a mandrel main portion according to a first modification of pin holding grooves.
Figure 12:
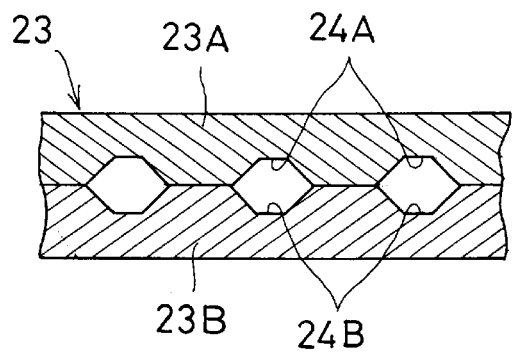
FIG. 12 is a cross-sectional view of a mandrel main portion according to a second modification of pin holding grooves.

In cases where the cross-section of the pin holding groove 24A and 24B, which is formed in the divided members 23A and 23B by which the pin 9 is pinched, is a semicircle, the pin 9 can be quickly inserted between the divided members by twisting it. However, the cross-section of the pin holding groove 24A and 24B can be arbitrarily designed in accordance with the cross-section of the pin 9. For example, as shown in FIGS. 11 and 12, the pin holding groove 24A, 24B may have a rectangular cross-section or a polygonal cross-section. In these cases, the pin 9 held by and between the divided members 23A and 23B is prevented from being rotated, which can enhance the holding status. Furthermore, it is possible to employ a star-shaped cross-section as a cross-section of the pin holding groove.

By the way, the dividing direction of the mandrel main portion 23 can be selected arbitrarily. However, in cases where the mandrel main portion 23 is divided in the thickness direction as shown in this embodiment, a plurality of rigid pins 9 arranged in parallel with each other can be integrally and stably pinched by and between the divided members 24A and 24B.

In the aforementioned, a plurality of rigid pins 9 are pinched by and between the divided members 23A and 23B, and then the mandrel main portion 23 is forcibly inserted into the mandrel holding slit 18, whereby the rigid pins 9 are generally fixed to the mandrel main portion 23. Instead of the above, the plurality of rigid pins 9 may be pinched by and between the divided members 23A and 23B, and then the divided members 23A and 23B may be fixed and joined. Thereafter, the joined divided members 23A and 23B may be inserted into the mandrel holding slit 18.

Furthermore, according to the aforementioned embodiment, the hollow member 1 having a plurality of hollow portions 1a arranged side by side in a single row is formed (in other words, the die has a plurality of rigid pins 9a arranged side by side in a single row). However, in the present invention, a hollow member having a plurality of hollow portions arranged in two or more rows may be formed (in other words, the die may have a plurality of rigid pins 9a arranged in two or more rows). In this case, it is possible to easily manufacture such a hollow member by increasing the divided number of mandrel main portion 23.

This application corresponds to the Japanese Patent Application No. 11-373173 filed on Dec. 28, 1999, the disclosure of which is incorporated by reference in its entirety.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims.

What is claimed is:

1. An extrusion die for a hollow member, comprising:
   a male die for defining a plurality of hollow portions of said hollow member; and
   a female die for defining an outer peripheral portion of said hollow member,
   wherein said male die is provided with an annular base portion, a bridge portion bridging said annular base portion in a radial direction of said annular base portion, and a mandrel having a plurality of forming protrusions.
   wherein said bridge portion is provided with a mandrel holding slit formed in a fore-and-aft direction,
   wherein said mandrel includes a mandrel main portion divided into a plurality of divided members and a plurality of rigid pins each arranged in a fore-and-aft direction of said mandrel main portion,
   wherein said plurality of rigid pins are pinched by and between said divided members of said mandrel main portion with tip portions of said plurality of rigid pins protruding from a front end of said mandrel main portion, whereby said plurality of tip portions constitute said plurality of forming protrusions, and
   wherein said mandrel main portion is inserted into said mandrel holding slit of said bridge portion to be held therein.

2. The extrusion die for a hollow member as recited in claim 1, wherein pin holding grooves are formed on opposing surfaces of said divided members.

3. The extrusion die for a hollow member as recited in claim 2, wherein each of said pin holding grooves has a semicircle-shaped cross-section.

4. The extrusion die for a hollow member as recited in claim 1, wherein said mandrel main portion is forcibly inserted into said mandrel holding slit.

5. The extrusion die for a hollow member as recited in claim 1, wherein said mandrel main portion is divided in a thickness direction thereof.

6. The extrusion die for a hollow member as recited in claim 1, wherein said mandrel has an engaging portion at a rear end portion of said mandrel main portion, and wherein said mandrel holding slit has an engaging step corresponding to said engaging portion, whereby said engaging portion is engaged with said engaging step in a state that said mandrel main portion is inserted and held in said mandrel holding slit.

7. The extrusion die for a hollow member as recited in claim 1, wherein said plurality of rigid pins are arranged side by side in a single row.

8. A male die for an extrusion die, wherein said male die defines a plurality of hollow portions of a hollow member in combination with a female die defining an outer peripheral configuration of the hollow member, said male die comprising:
   an annular base portion;
   a bridge portion bridging said annular base portion in a radial direction of said annular base portion; and a mandrel having a plurality of forming protrusions, wherein said bridge portion is provided with a mandrel holding slit formed in a fore-and-aft direction, wherein said mandrel includes a mandrel main portion divided into a plurality of divided members and a plurality of rigid pins each arranged in a fore-and-aft direction of said mandrel main portion, and wherein said plurality of rigid pins are pinched by and between said divided members of said mandrel main portion with tip portions of said plurality of rigid pins protruding from a front end of said mandrel main portion, whereby said plurality of tip portions constitutes said plurality of forming protrusions, and wherein said mandrel main portion is inserted into said mandrel holding slit of said bridge portion to be held therein.

9. The male die as recited in claim 8, wherein pin holding grooves are formed on opposing surfaces of said divided members.

10. The male die as recited in claim 9, wherein each of said pin holding grooves has a semicircle-shaped cross-section.

11. The male die as recited in claim 8, wherein said mandrel main portion is divided in a thickness direction thereof.

12. The male die as recited in claim 8, wherein said plurality of rigid pins are arranged side by side in a single row.

13. The male die as recited in claim 12, wherein said mandrel has an engaging portion at a rear end portion of said mandrel main portion, and wherein said mandrel holding slit has an engaging step corresponding to said engaging portion, whereby said engaging portion is engaged with said engaging step in a state that said mandrel main portion is inserted and held in said mandrel holding slit.

* * * * *